United States Patent [19]

Funatsu et al.

[11] 4,196,434
[45] Apr. 1, 1980

[54] SURVEILLANCE SYSTEM FOR COLLISION AVOIDANCE OF AIRCRAFTS USING RADAR BEACON

[75] Inventors: Chuhei Funatsu, Yokohama; Toshikiyo Hirata, Samukawa, both of Japan

[73] Assignee: Toyo Tsushinki Kabushiki Kaisha, Kawasaki, Japan

[21] Appl. No.: 833,597

[22] Filed: Sep. 15, 1977

[30] Foreign Application Priority Data

Sep. 20, 1976 [JP] Japan .............................. 51-112553

[51] Int. Cl.² .......................... G01S 9/56; G08G 5/04
[52] U.S. Cl. .......................... 343/6.5 R; 343/112 CA
[58] Field of Search ............. 343/112 CA, 6.5 R, 6 R

[56] References Cited
U.S. PATENT DOCUMENTS

| 3,293,600 | 12/1966 | Gifft | 343/112 CA |
| 3,626,411 | 12/1971 | Litchford | 343/112 CA |
| 3,757,324 | 9/1973 | Litchford | 343/6.5 R |
| 3,803,604 | 4/1974 | Case | 343/112 CA |
| 3,875,570 | 4/1975 | Litchford | 343/112 CA |
| 3,959,793 | 5/1976 | Litchford | 343/112 CA |
| 4,021,802 | 5/1977 | Litchford | 343/112 CA |
| 4,027,307 | 5/1977 | Litchford | 343/112 CA |

Primary Examiner—Maynard R. Wilbur
Assistant Examiner—Richard E. Berger

[57] ABSTRACT

A collision avoidance system using on-board B-CAS equipment having an object to minimize interference with the ground SSR stations and to effect precise tracking or distance-altitude measurement when necessary. Normally passive surveillance is made to detect the presence of other aircraft in the B-CAS range. Active surveillance is added when required. In the active surveillance mode, initiated on locating an intruder aircraft, the power and interrogation signal are varied when the intruder aircraft becomes a threat aircraft to minimize interference with the ground SSR stations and aircraft outside the threat zone while maintaining accuracy of detection and tracking of the threat aircraft at a high level.

16 Claims, 14 Drawing Figures

FIG. 1
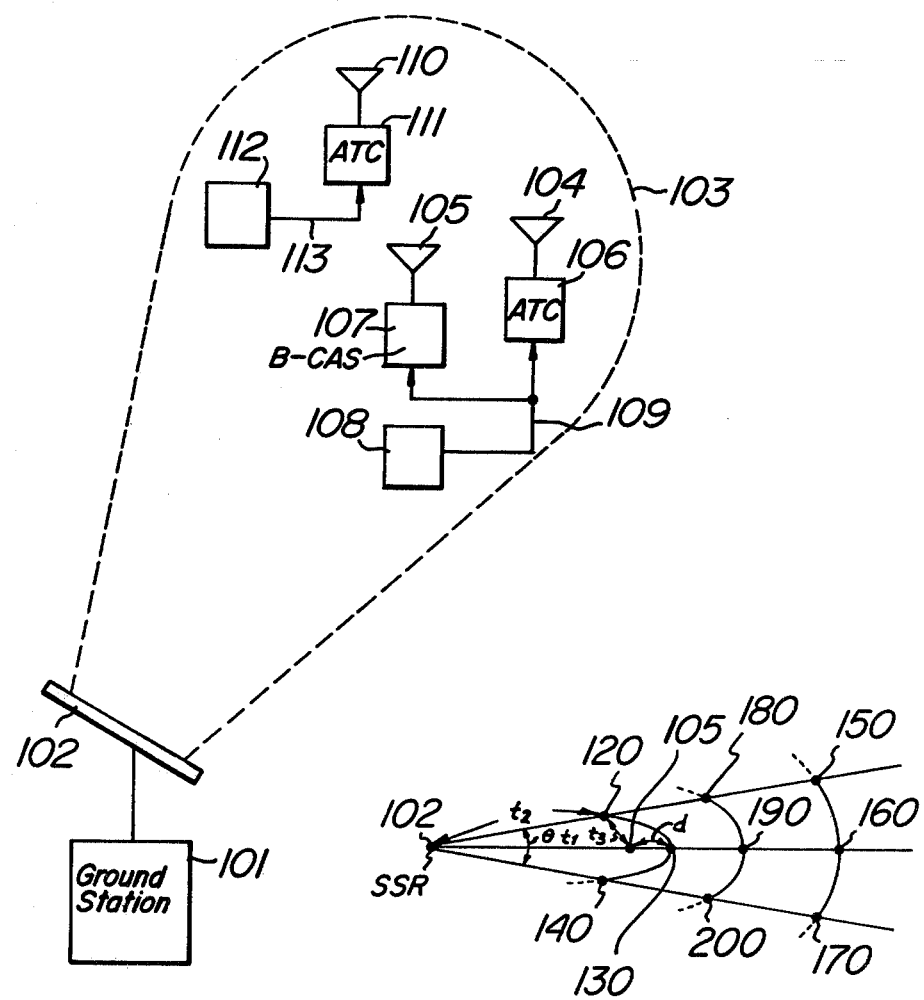
FIG. 4a
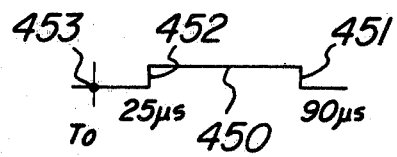
FIG. 4b

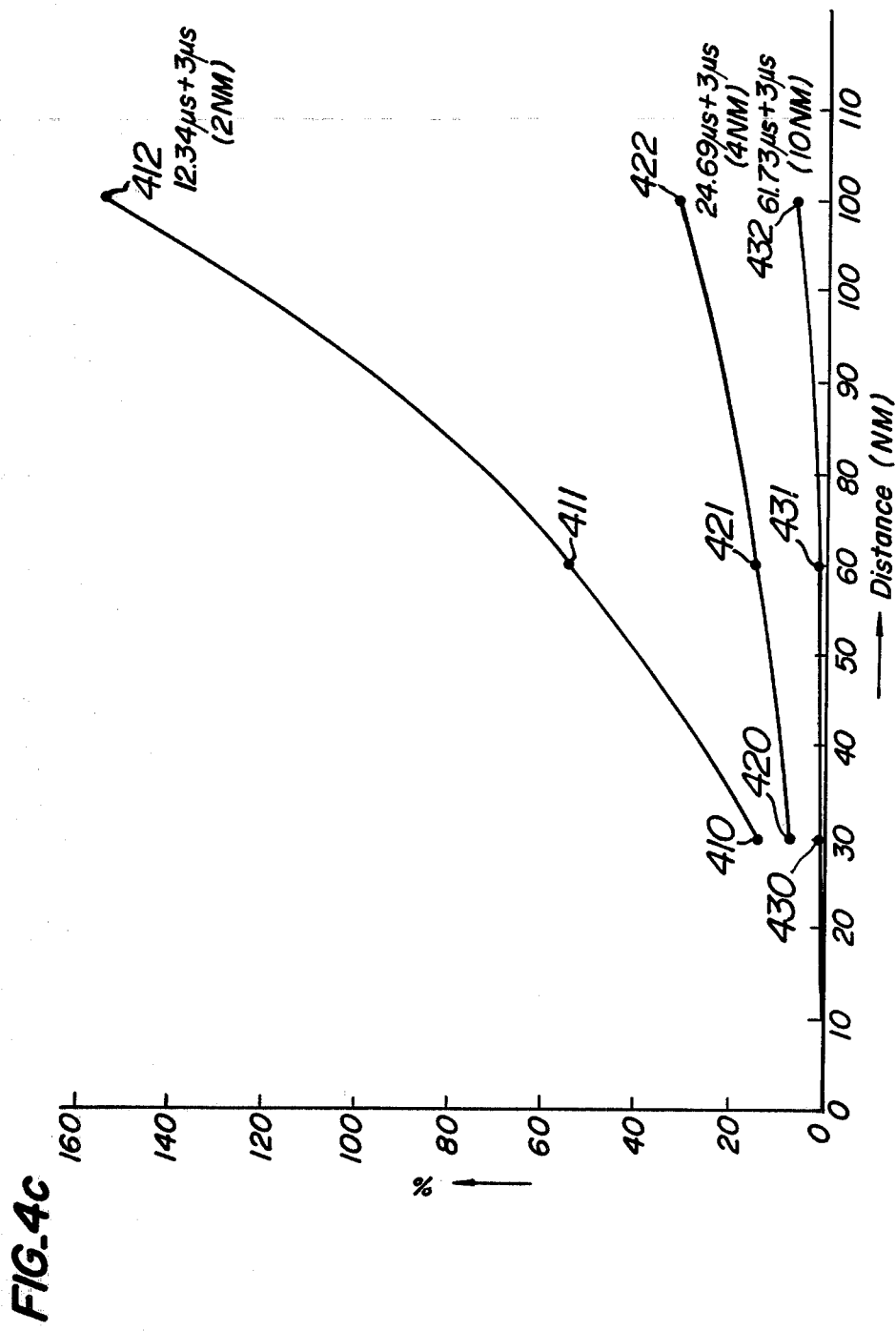

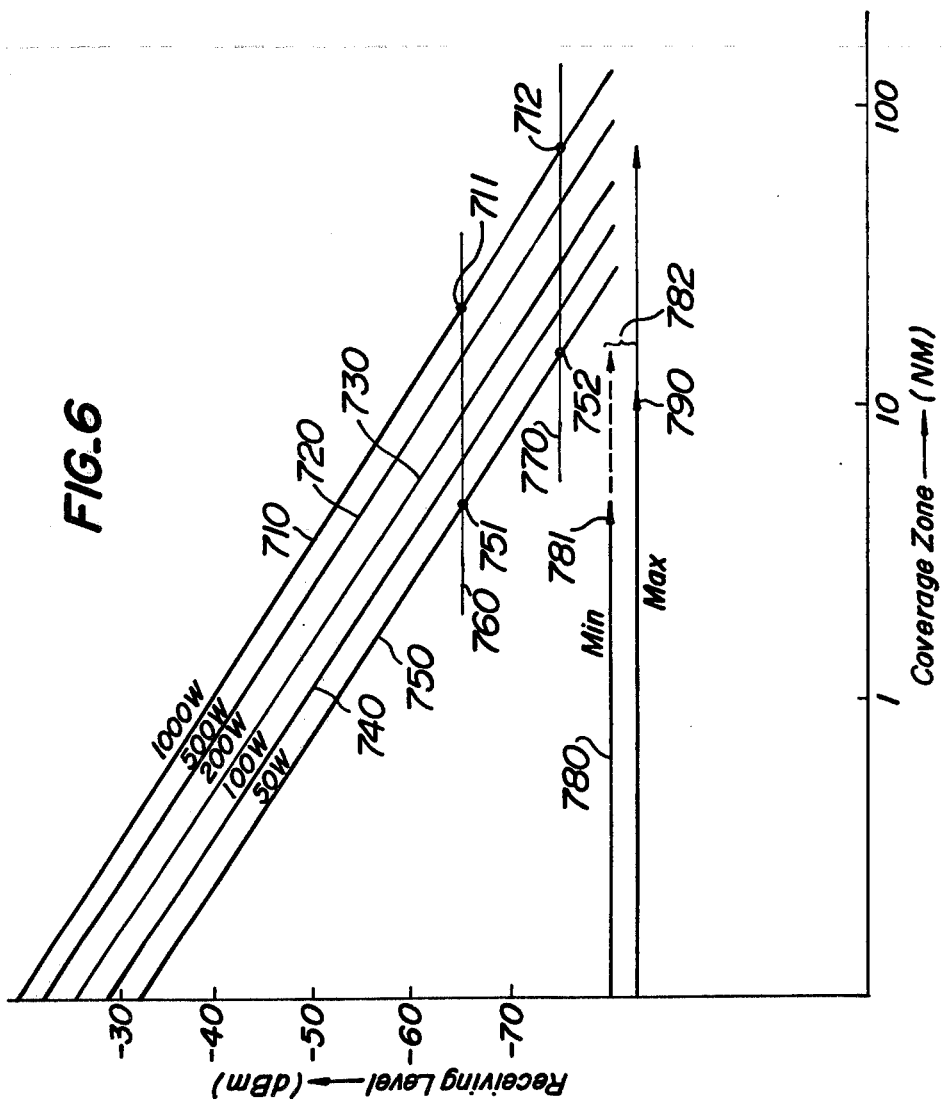

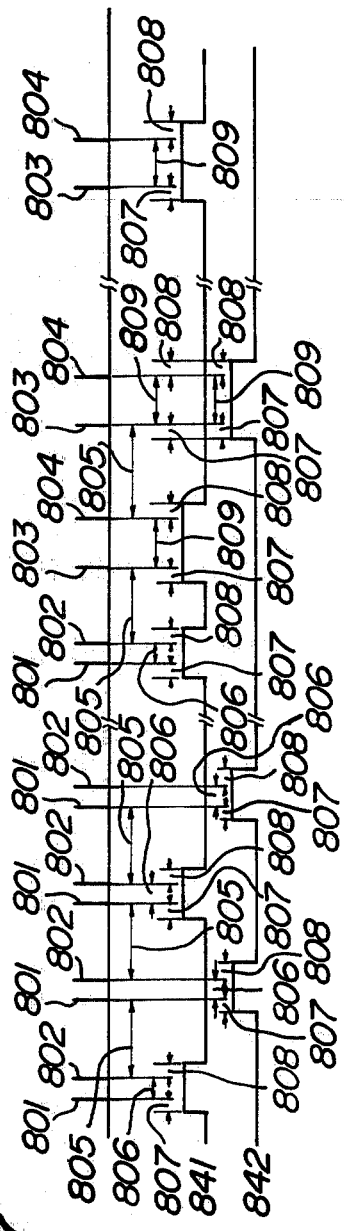
FIG.7
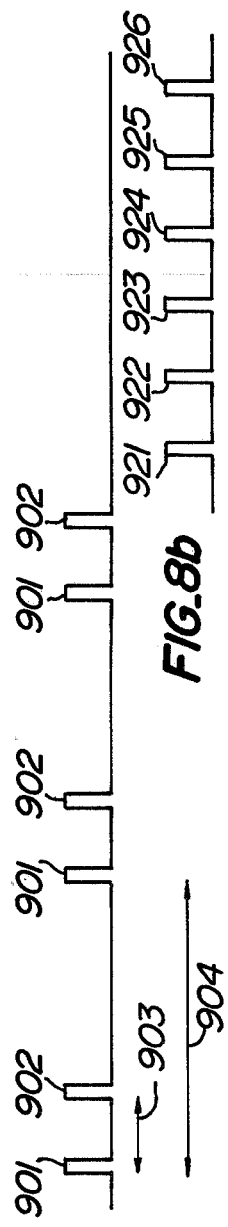
FIG.8a
FIG.8b

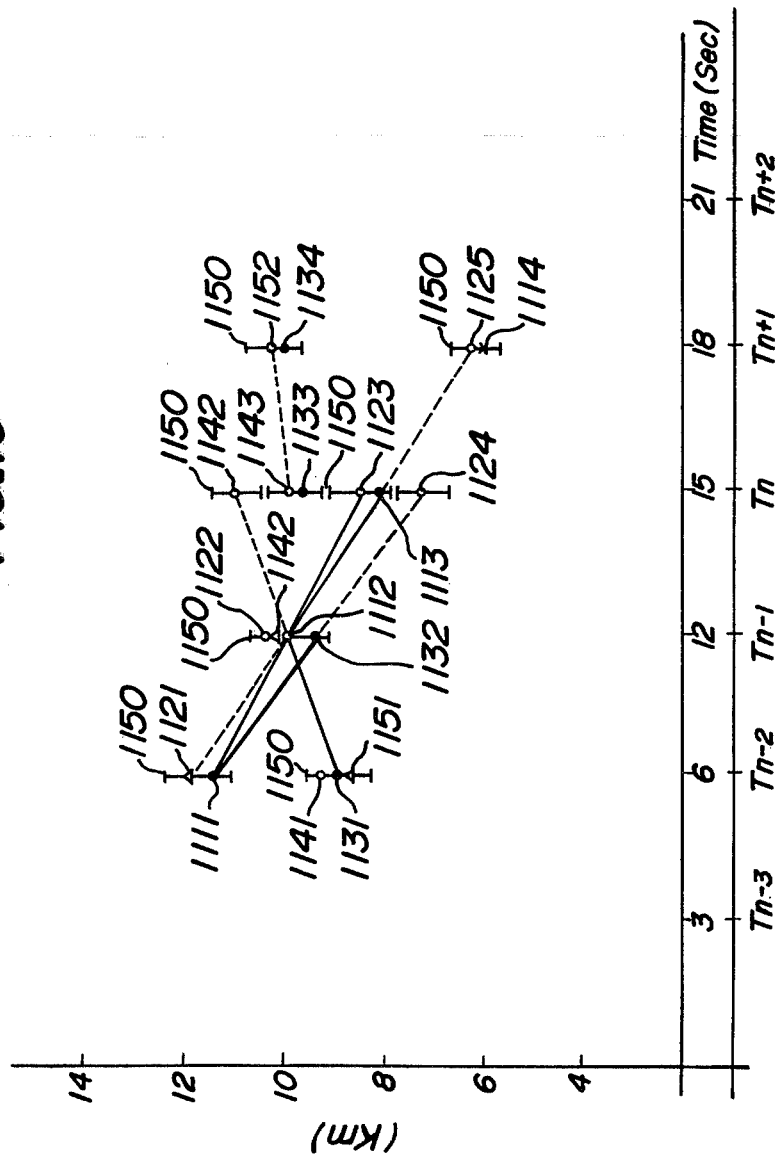

SURVEILLANCE SYSTEM FOR COLLISION AVOIDANCE OF AIRCRAFTS USING RADAR BEACON

BACKGROUND OF THE INVENTION

The present invention relates to a surveillance system for avoiding collision of aircraft. The system is intended to prevent aircraft collision by providing a suitable threat signal or the like when danger of collision is imminent by surveilling other intruder aircrafts during flight.

Danger of collision between aircraft has been greatly increased due to increased air traffic in the same aerial space, at the same altitude and at the same time. Should a collision occur, a large number of victims and extensive damage both to the aircraft and ground objects can be expected. Obviously, compensation claims for damages to passengers alone will run extremely high, bearing in mind that the aircraft may carry as many as 400 passengers.

Accordingly, ensuring safe navigation of aircraft is a problem to be contended with. Safe navigation of the aircraft with existing air traffic control systems including ground radar is affected by geographical considerations, split antenna patterns, and possible dead time of 1 to 2 minutes occurring when the air traffic control operation is transferred at a boundary of an area.

To cope with these problems, aircraft have been equipped to effect surveillance and other operations to avoid collision between aircraft by not relying solely on the ground facility for safe navigation of the aircraft.

SUMMARY OF THE INVENTION

In the system of the present invention, for economic reasons, we use Beacon Collision Avoidance Systems (hereinafter referred to B-CAS) which incorporate existing ATC transponders. The objective of the present invention is to provide a system in which the influence by B-CAS on the ground equipped secondary surveillance radar system is minimized.

Generally speaking, distance measurement and surveillance systems using B-CAS in an aircraft can be classified in two groups.

The first is the so-called passive surveillance system. The passive surveillance system functions to search for other aircraft and to measure the distance thereto by using ground equipped secondary surveillance radar (hereinafter referred to SSR) and its interrogation signal of MODE-A or MODE-C (based on ICAO standard ANNEX-10) and by monitoring the response signal of the ATC transponder of the other aircraft one is capable of detecting the electric field strength of the received wave or of measuring the time interval between the reception of the interrogation signal from the ground radar and reception of the response signal of the other aircraft by one's aircraft.

The second is the so-called active surveillance system. In the active surveillance system, an interrogation signal either MODE-A or MODE-C is sent from one's aircraft to an ATC transponder of another aircraft and the time between transmission of the integration signal and the time of receipt of the response signal from the other aircraft is measured, thereby providing positive determination of the other aircraft and enabling distance measurement thereto.

BRIEF DESCRIPTION OF THE DRAWINGS

The invention will now be described by referring to the accompanied drawing, in which, FIG. 1 is a block diagram for explaining general system of the secondary surveillance radar and the ATC transponder;

FIG. 4a is a diagram for determining accuracy of distance measurement in the passive surveillance mode;

FIG. 4b shows the gate signal used in the passive surveillance mode for improving distance measurement;

FIG. 4c is a plot of distance of a given aircraft from a radar ground station vs error rate of distance measurement;

FIG. 6 is a diagram for explaining coverage zone of the active distance measurement system;

FIG. 7 is a diagram for explaining the manner of interrogation in the active distance measurement system, FIG. 8a shows the interval of interrogation pulses used for locating intruder aircraft;

FIG. 8b shows the interval of interrogation pulses used for locating threat aircraft;

FIG. 10 is a diagram for explaining tracing in case of the active distance measurement system.

DESCRIPTION OF THE PREFERRED EMBODIMENTS

Figure 2:
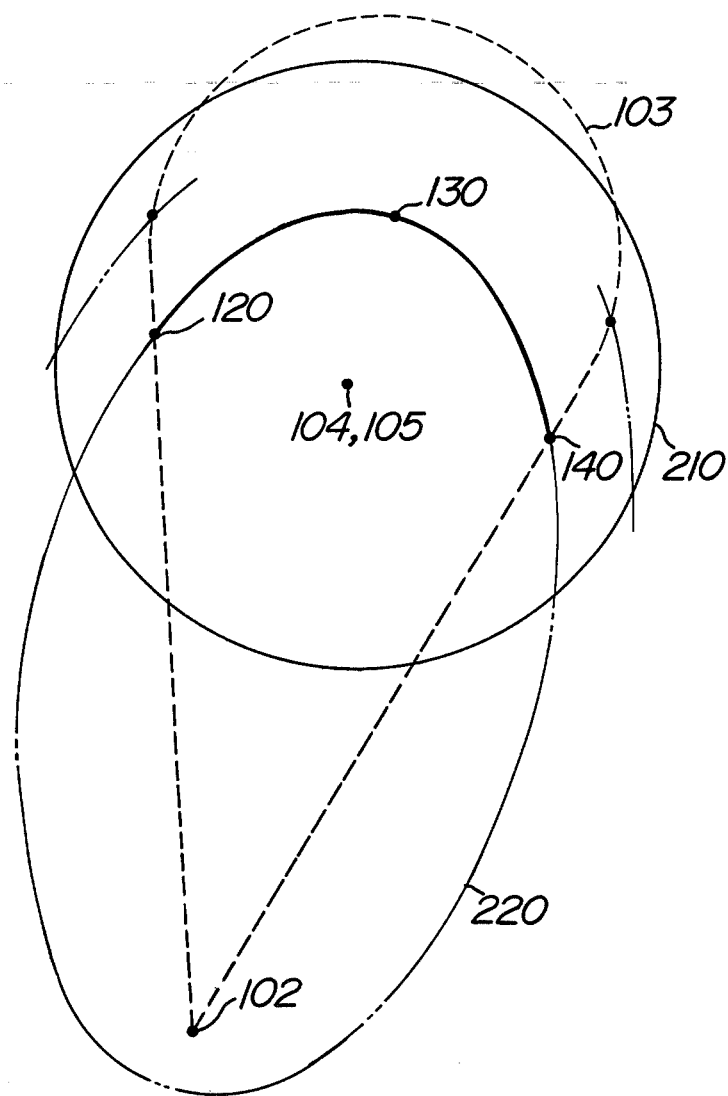
FIG. 2 is a diagram for explaining the principle of passive distance measurement system.

For a better understanding of the present invention, a brief summary of existing passive and active surveillance systems will first be given.

Passive Surveillance System

In FIG. 1, which generally shows a passive surveillance system, 101 denotes a ground interrogation station and 102 is an antenna for irradiating the interrogation signal within an aerial space. Irradiation of the electromagnetic wave is made in a scanning mode with sufficient directivity. 103 bounds an area in which the field strength of the irradiated electromagnetic wave from the antenna 102 exceeds a certain level, i.e. respondable level of the ATC transponder at a given time. An ATC transponder 106 of one's aircraft (hereinafter referred to as a "given aircraft") transmits a predetermined response signal by way of receiving and transmitting antenna 104, upon receipt of the interrogation signal after a very short predetermined time interval. The given aircraft is also equipped with a B-CAS 107 which has its own antenna 105. Since both antennas 104 and 105 are mounted on the given aircraft the distance between them is very small.

Assuming the other aircraft to be in the same aerial space as the given aircraft and assuming it is equipped with an ATC transponder 111 having an associated transmission and receiving antenna 110, the ATC transponder 111 on the other aircraft located within boundary 103 will receive the same interrogation signal by way of antenna 110 and will also transmit a response signal after lapse of a predetermined time from the reception by the other aircraft of the interrogation signal. The response signal of the aircraft is generally of a non-directional nature so that it is also received by the antenna 105 of the B-CAS 107 of the given aircraft. The distance between the given aircraft and other aircraft can approximately be determined using the following steps (a), (b) or (c).

In the following, FIGS. 1 and 2 are referred to.

(a) The time from the starting point of irradiation of the interrogation wave from the antenna 102 of the ground interrogation station 101 to its reception by the antenna 104 of the transponder 106 of the given aircraft is assumed as $t_1$ ($\mu s$). The time from the starting of irradiation from 102 to the time of emitting a response signal by the transponder 111 on the other aircraft, with a certain predetermined small delay after receipt of the transmitted signal by ATC transponder 111 through its antenna 110, is assumed as $t_2$ ($\mu s$). The time required for the reception of the response signal of the ATC transponder 111 of the other aircraft by B-CAS 107 of the given aircraft is assumed as $t_3$ ($\mu s$).

The relative distance $R(\Delta t)m$ between the given aircraft and the other aircraft can be determined by the following formula (2) from time $\Delta t$ ($\mu s$), which in turn is calculated by the following formula (1) using the above times $t_1$ ($\mu s$), $t_2$ ($\mu s$) and $t_3$ ($\mu s$).

$$\{(t_2(\mu s)+t_3(\mu s))-3(\mu s)\}-t_1(\mu s)=\Delta t(\mu s) \quad (1)$$

$$\Delta t(\mu s) \times 300 m/\mu s = R(\Delta t)m \quad (2)$$

wherein 300 m/$\mu s$ is the propagation velocity of the electromagnetic wave.

The given aircraft, as will be appreciated, cannot identify the time of response of the ATC transponder of the other aircraft. This means that the given aircraft cannot determine the time $t_2$, only the time $(t_2+t_3)$.

Loci of positions where the sum of $(t_2+t_3)$ becomes constant lie on a rotating ellipsoid having its foci at the ground antenna 102 and the antenna 105. The other aircraft may locate on such loci when the sum of $(t_2+t_3)$ is a constant.

(b) The chances that both the ATC transponders 106 and 111 of the given and the other aircraft will receive the same wave emitted from the antenna 102 are limited to the case where both aircraft are located in the radiation pattern 103 of FIG. 1. For this reason, the determination of the existence of the other aircraft is limited to the range shown by the solid line connecting points 120-130-140 on the loci 220 of FIG. 2.

(c) Since the transmission power of the response wave of the ATC transponder lies in a range decided by ICAO ANNEX-10, TSO-74C and other standards, the receiving level of the response signal of the other aircraft received by the given aircraft is a function of distance between the given and the other aircraft and is expressed by the known Bullington's (K. Bullington) formula (3) below.

$$Pr = (\frac{\lambda}{42d})^2 \cdot Pt \cdot Gt \cdot Gr \quad (3)$$

wherein,

Pr: is the receiving level
Gr: is the grain of the receiving antenna
d: is the distance between the given and the other aircraft
Pt: is the transmission power
Gt: is the gain of the transmitting antenna
$\lambda$: is the wavelength of the transmitted wave Accordingly, if the receiving level of the given aircraft exceeds a certain value, it can be presumed that the other aircraft is within the spherical area 210 having its center at the antenna 105.

However, the above is true only for the case where the reception level is exactly proportional to the square value of the distance between the two aircraft. Accordingly, the actual reception level Pr is considerably different from that obtained with the above equation for reasons later to be explained. The spherical surface 210 should more practically be considered as a surface connecting the maximum values of Pr.

A coarse distance measurement can thus be obtained with the passive surveillance system using any one of steps (a), (b), (c) independently or in combination. In the passive surveillance system, surveillance is effected only by the reception of or listening to signals received by the given aircraft. Since the passive surveillance system, the given aircraft relies on radiation from the SSR and does not itself send interrogation signals, it has the merit that it will not interfere with the operation of the SSR system.

Step (a), a time determination, utilizes the "time" between the time of reception of an interrogation signal by the given aircraft and the time of reception of the response signal from the other aircraft. It has the following problems. Should the other aircraft be located on a line connecting the given aircraft and the antenna 102 of the ground SSR station or close to it, the aforementioned "time" becomes independent of the distance between the two aircraft and constitutes instead "the predetermined time of 3 $\mu s$ from the reception of the ATC transponder of the other aircraft to the emission of the response signal" and the value of $\Delta t$ in equation (1) becomes 0 so that the mutual distance is calculated as 0.

Step (c) using the receiving electric field strength of the response signal of the ATC transponder for distance measurement also has certain problems. Because the reception level Pr is not uniform, and depending on the direction of irradiation pattern of the transmitting antenna 110 and the receiving antenna 105, and additionally since the power transmitted from the aircraft has a certain fluctuation tolerance, the received signal may vary for a given distance due, as indicated, to equipment tolerances and direction and attitude of the other aircraft. Besides the above, since the passive surveillance system utilizes the signal from ground SSR station the following additional factors must be considered.

(A) The system does not act predictably outside the coverage zone of the SSR station.
(B) The surveillance accuracy and surveyable area may vary greatly even in a coverage zone of an SSR station as a function of location of the station, the number thereof and the characteristics of the radar equipment used (antenna beam angle, number of revolution of the antenna, etc.)

Therefore, the passive surveillance system can provide only rough distance measurements and the aircraft's approximate location can only be determined. It is virtually impossible with this system to estimate the time before collision (TAU) or approaching speed from the variation observed from the measured values.

ACTIVE SURVEILLANCE SYSTEM

In considering an active surveillance system, the ground SSR station 101, the antenna 102 thereof and the irradiation wave pattern 103 shown in FIG. 1 can generally be disregarded, it being understood, however, that an interrogation signal transmitting facility is provided in the B-CAS 107 of the given aircraft. The time $t_0$ of irradiation of the interrogation signal MODE-A or MODE-C of the given aircraft is assumed as the starting point and by determining the time $\Delta t_0$ which is the difference between the time $t_4$, the time of reception by the given aircraft of the response signal of the ATC transponder 110 of another aircraft, and the time $t_0$, the distance between the two aircraft may be determined. Such active surveillance system affords a more accurate distance determination than the passive surveillance system.

The distance $d_m$ between the given and the other aircraft can be derived from the following formulae (4) and (5).

$$t_4 - t_0 = \Delta t_0 (\mu s) \quad (4)$$

$$(\Delta t_0 - 3)\mu s \times 150 m/\mu s = d_m \quad (5)$$

wherein,
150 m/$\mu$s: ½ of velocity of electromagnetic wave (for reciprocation)
3 $\mu$s: response delay time With the active surveillance system, a highly accurate measurement of the distance is possible. If the B-CAS 107 of the given aircraft is provided with equipment for calculating and measuring for changes in $\Delta t_0(\mu s)$, it would then be possible to accurately determine the approaching speed of the two aircrafts and this would further contribute to the prevention of collision.

In the active surveillance system, it is also possible to determine the altitude of the other aircraft by irradiating the MODE-C interrogation signal from the antenna 105 of the given aircraft in response to which the other aircraft sends a response signal which includes altitude information. The altitude of the given aircraft can be determined from its manometer. The remainder of the difference between the altitude of the given aircraft and the other aircraft provides the indication of the distance separating the aircraft in elevation.

Because the active surveillance system itself transmits electromagnetic waves, it opens the possibility of interfering with the operation of ground SSR stations, a problem which does not exist with the passive surveillance system. The following are some possible disturbances which the ground SSR stations may be subjected to when using the active surveillance system.

When navigating aircraft interrogate each other, the response signals of the transponders are received not only by the aircraft but also by a given SSR ground station. In this case, the ground SSR station receives not only the response from an aircraft to its interrogation signal but may also receive the response signal from that aircraft to the B-CAS interrogation signal transmitted from another aircraft. Such an additional response signal will interefere with the response from the aircraft to the ground interrogation signal. Interference resulting from response signals other than to a given interrogation signal is termed "fruit noise". Increase in "fruit noise" will interfere with ground SSR operations.

A response to a ground SSR interrogation signal may not be received from another aircraft by the ground SSR station if an interrogation signal from a B-CAS system of a given aircraft is transmitted immediately before the ground station interrogation signal and the ATC-transponder of the other aircraft is in the process of sending a response signal or has just completed such response signal so that the response operation of the ATC transponder to the SSR interrogation signal is interefered with. This is because an ATC-transponder cannot respond to more than one interrogation signal. Existing regulations call for 150$\mu$ second dead time or non-response time for an ATC-transponder after sending a response signal.

Up to now, either passive or active surveillance systems have been employed but never in combination as contemplated by this invention. For example, a typical system in which the passive surveillance is used exclusively is suggested by Litchford. For such system, a plurality of SSR stations are provided. The distance of an aircraft is determined exclusively by the passive surveillance system utilizing a number of the ground SSR stations. Considering a number of rotating ellipsoid surfaces, having as their focus a given aircraft, and the plurality of the ground SSR stations, the distance to an other aircraft is obtained at intersections of the rotating ellipsoid surfaces.

The Litchford system, however, requires special equipment for use with existing SSR ground stations to transmit a "North Marker" to enable more accurate calculations of the location of other aircraft. The need for this special additional equipment means that existing ATC transponders (fixed by international agreement) cannot be used in the same standard form, thus constituting a drawback of the system.

According to Litchford, two or more ground SSR stations my suffice. However, although the distance between a given aircraft and the ground SSR station is determinable, there is nevertheless the disadvantage that the surveyable area is too narrow if the number of stations is merely two or thereabout. This means nonguarded areas exist. Also, with such system, the accuracy of distance measurements and surveyable zone vary considerably depending on the location of the given aircraft, the other aircraft and the ground stations.

A system has also been used employing the active surveillance mode exclusively. This system provides interrogations from B-CAS equipment either in MODE-C alone or in combination with MODE-A. The mode of interrogation may differ depending on the design. The interrogation signal is however transmitted at fixed time intervals for instance at each one second, 0.5 second, 0.15 second, etc. The number of electromagnetic wave interrogation signals transmitted is in proportion to the number of aircraft present in an aerial zone.

This system enables an accurate distance measurement, this being a feature of the active surveillance system. However, as abovenoted, it gives rise to the problem of interfering with the operation of the SSR stations. Desirably, therefore, active surveillance should be made only when actually needed with minimum number of transmissions and minimum transmission power to make the system more effective.

In the present invention, we use the combination of a passive surveillance for main surveillance purposes and an active surveillance having small power requirements for determining the presence of "intruder" and "threat" aircraft. When determining the presence of intruder aircraft only approximate distances between a given and an other aircraft need be provided, more accurate distance measurements being provided when threat conditions arise. In such case, an interrogation signal is emitted by the given aircraft at minimum power and the least number of times to obtain positional information, i.e. the distance between the given and the other aircraft, the difference in altitude and the approaching speed of the aircraft. The number of interrogations per second in our system is a function of positional information as will become apparent from the disclosure to follow.

Figure 3:
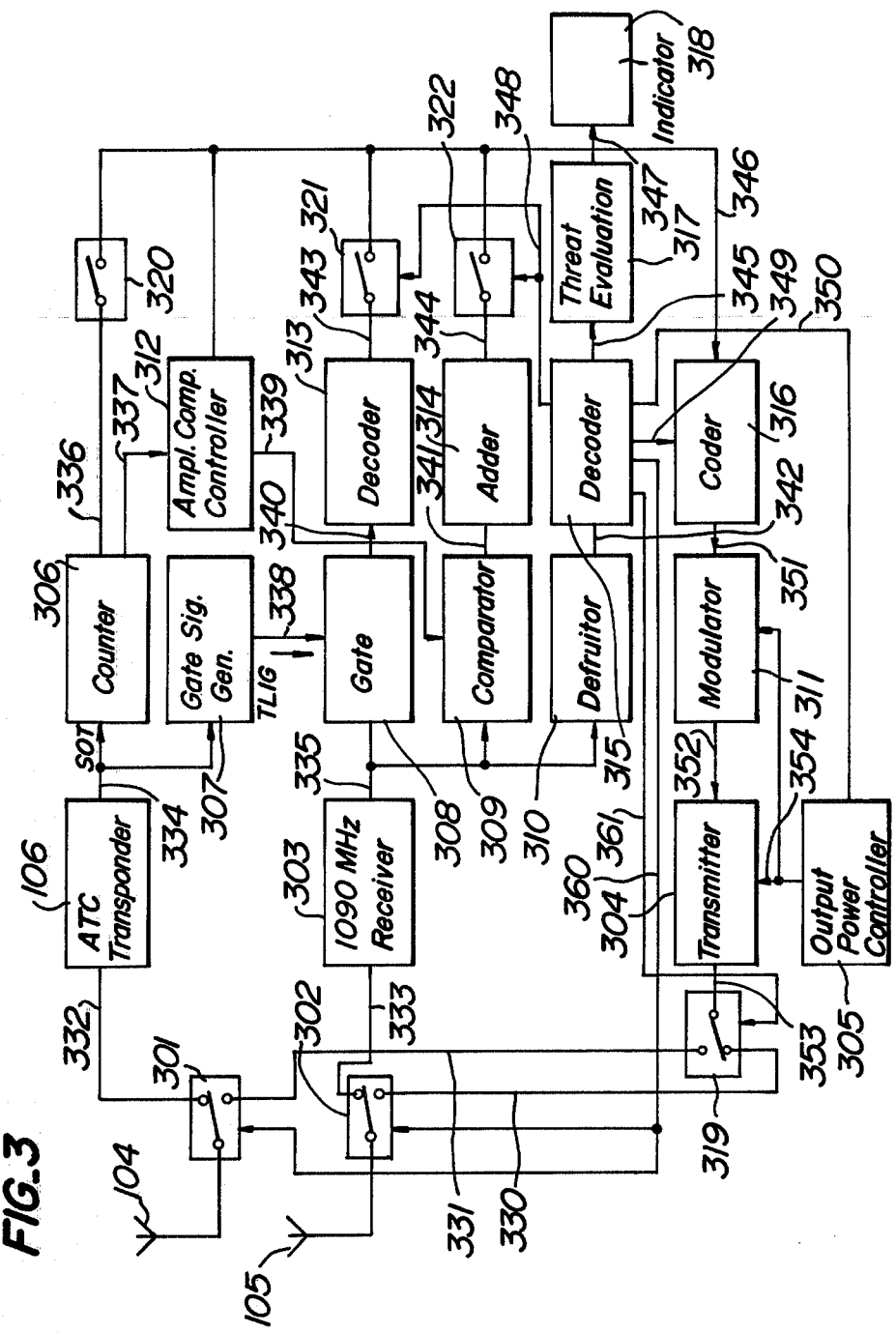
FIG. 3 is a block diagram for explaining an embodiment of the system of the present invention.

FIG. 3 is a block diagram for explaining the operation of the system of the present invention.

The interrogation signal from an SSR station is received by an aircraft antenna 104 and is fed to an ATC-transponder 106 through antenna switch 301 and line 332. The signal is decoded therein and a response signal to the interrogation is provided by the ATC-transponder 106 via line 332 and switch 301 for transmission by the antenna 104. During the time of response to the interrogation signal, the ATC-transponder 106 functions to generate a gate signal to open a gate from the time decoding of the interrogation signal comences to a time when the response thereto is completed. Details of the gate signal will be described later. The gate signal also termed "suppression out signal (SOT)", is supplied to line 334 and is used to prevent possible harmful interference of the response signal of the ATC-transponder with other on-board electronic equipment such as known under the abbreviations TACAN or VOR-DME or the like. This suppression out signal (SOT) is supplied to the abovementioned equipment during the response of the ATC-transponder 106.

The utilization of said suppression out (SOT) signal with B-CAS will be described later on.

PASSIVE SURVEILLANCE

The response signal of an ATC-transponder of an other aircraft which is transmitted in response to an interrogation signal from a ground SSR station is received by antenna 105 of the given aircraft and is fed to its receiver 303 via antenna switch 302 and line 333. The receiver 303 is capable of demodulating an ordinary pulse amplitude modulated signal and it may have a receiver sensitivity of video to noise ratio of 2:1 at an input level of $-75$ dBm. A video signal output from the receiver 303 is applied via a line 335 to a gate circuit 308, to an amplitude comparator 309 and to a defruit circuit or a defruiter 310, respectively. In the passive surveillance mode of operation, the defruitor 310 is not involved in the operation.

The gate circuit 308 and the amplitude comparator 309 are provided for detecting the distance between a given and another aircraft in accordance with aforementioned steps (a), (b) and (c) of the passive surveillance mode. The video signal supplied to the gate circuit 308 via the line 335 passes this gate only when a gate signal supplied through a line 338 is in a high level and provides an output of the gate on a line 340. The gate signal supplied through the line 338 is generated in a gate signal generator 307, which is triggered by the suppression out signal (SOT), which had been generated in the ATC-transponder 106 of the given aircraft when its transponder responds to an interrogation signal of the ground SSR station. The gate signal is shown in FIG. 4(b).

In FIG. 4(b), front edge $T_0$ of the gate signal is shown by a time point 453 in a low level. At a time point 452 which is after lapse of 25 μs from the time point 453, the gate signal assumes a high value 450. The high value condition of 450 is maintained up to a time point 451 which is 90 μs after the time $T_0$ and the signal assumes the low level again at this time point. This gate signal, also referred to as "Term-Listen-in Gate" or "TLIG", is supplied to the gate circuit 308 and the video signal applied to the input of this gate circuit 308 via line 335 is gated out during the high level 450 of TLIG and the output video signal is delivered to line 340. This output on the line 340 constitutes an element for the passive surveillance in the aforementioned steps (a) and (b).

The output signal on the line 340 is applied to a decoder 313. The decoder 313 functions to determine whether the output signal of the gate circuit 308 on the line 340 correctly corresponds to the suppression out signal (SOT) or not and also in accordance with equation (2) of step (a) to obtain $R(\Delta t)$ from $\Delta t(\mu s)$.

The decoder 313 is capable of determining whether the single output signal on the line 340 correctly corresponds to the suppression out signal (SOT) or not by utilizing the knowledge that the interrogation signal from the ground SSR station has a regular repetition period, for instance, a period of 2.5 to 5 ms. determination of such correspondence may be made by a check within decoder 313 whether the same $\Delta t$ is obtained for a number of interrogations. For example, if the same $\Delta t$ is obtained twice in response to two interrogations, it may be concluded that the condition of passive surveillance of steps (a) and (b) is satisfied in which case the decoder 313 output is supplied to line 343. When the decoder output is supplied to line 343 an active surveillance starting switch 321 is moved to its ON condition.

The accuracy of the passive surveillance system according to the steps (a) and (b) will be explained by referring to FIG. 4.

FIG. 4(a) is a diagram for deriving accuracy of distance measurement by using the principle of the step (a) mentioned above and wherein width of the antenna beam is defined by angle θ. A general value for this angle is given by $\theta = 6°$. The interrogation signal sent from a ground SSR station antenna 102 is received within a time $t_1$ μs by the given aircraft and the response signal of the other aircraft is received by the same given aircraft within a time $t_2\mu s + t_3\mu s + 3\mu s$. If the other aircraft is located at a point on the rotating ellipsoid 120, 130, 140 . . . , the calculated value of $R(\Delta t)$ will not change and will remain the same. The calculated value $R(\Delta t)$ will concide with the real distance value only when the other aircraft is located on an extending line connecting the groun SSR station antenna 102 and antenna 105 of the given aircraft. $R(\Delta t)$ at such time will be equal to d shown in FIG. 4a. The accuracy of measurement of distance is defined by "error rate of measured distance". Said rate is the ratio between a measured value at the point 120 or 140, which may include the maximum error, and the real distance value d, which may be measured at point 130.

FIG. 4(c) shows accuracy of distance measurement in the following cases.

$\Delta t = 12.34 \mu s + 3 \mu s$ at points 410, 411 and 412

$\Delta t = 24.69 \mu s + 3 \mu s$ at points 420, 421 and 422

Δt = 61.73μs + 3μs at points 430, 431 and 432 wherein it is assumed that θ = 6°. The diagram of FIG. 4(c) has as its abscissa the distance between the given aircraft and the ground SSR antenna 102 in nautical miles (NM), and its ordinate as the error rate of distance measurement (R(Δt)-d/d)×100 for each Δt. For instance, the error rate of distance measurement, when the distance between the ground SSR antenna 102 and the given aircraft is 110 NM, will be seen from point 432 on the first curve to be less than about 8% and at point 422 on second curve to be less than about 33%. This error becomes considerably larger at point 412 on the third curve; i.e. 156%. In order to improve the accuracy of this distance measurement even to a small extent, we provide the TLIG or gate signal with a leading edge at 452 (see FIG. 4b) which is delayed 25 μs after the generation of the suppression out signal (SOT) on the line 334 at the time $T_0$. Due to such delay only the first two curves will be involved in the measurement and the third curve or more curves are cut out from the measurement since they occur less than 25 μs in time. By this arrangement, the accuracy rate of the distance measurement is maintained less than 33%. This so-called "offset gate system" is not used, due to the offset, in measuring distances less than 4 NM. The offset gate system however provides definite advantages when measuring distances greater than 4 NM.

When the TLIG shown in FIG. 4(b) is used in the present invention, a gate having its lagging edge 90 μs from the time $T_0$ (time of generation of the suppression out signal) is used. Accordingly, the distance of other aircraft in a range of 7,500 m (4.05 NM) is determined at a maximum error rate of 33% as shown by a point 422 from the following equation.

$$90\mu s \times 300 \text{ m}/\mu s = 27,000 \text{ m}(14.57 \text{ NM}) - 25\mu s \times 300 \text{ m/s} = 7,500 \text{ m}(4.05 \text{ NM})$$

As shown in FIG. 4(c), the error rate is a function of the distance between the ground SSR station and given aircraft and the accuracy is improved with decrease of such distance. For example, in FIG. 4(c), if the distance is 50 NM, the error rate is 16% on point 421 on the second curve (real distance d is 4 NM) and is 2.5% on point 431 on the first curve (real distance d is 10 NM). If the distance is further decreased to 30 NM, the error rate is further decreased to about 8% or 1.5% as shown by point 420 or 430. Thus, as noted, the distance measurement accuracy is improved with decrease of distance. Usually the ground SSR station is located near a terminal where the density of aircrafts is large. Accordingly, the improved distance measurement accuracy provided by the invention when aircraft approach the ground SSR station is an advantage of the system.

In the system of the present invention, the above described passive surveillance system constitutes the main surveillance intended for precautionary purposes and is used primarily for detection of an approaching aircraft. As has been demonstrated, the passive mode contemplated by the present invention is an effective surveillance means.

However, inasmuch as the passive surveillance system is limited by the applicable range of the aerial space covered by the beam width of the ground SSR station, there is difficulty in detecting an other aircraft which lies in a range of 14 NM to 4 NM from a given aircraft, especially if only one ground SSR station is used. Accordingly, a plurality of ground SSR stations should be provided to enlarge the surveillance range, as more fully hereinafter described.

Figures 5A, 5B:
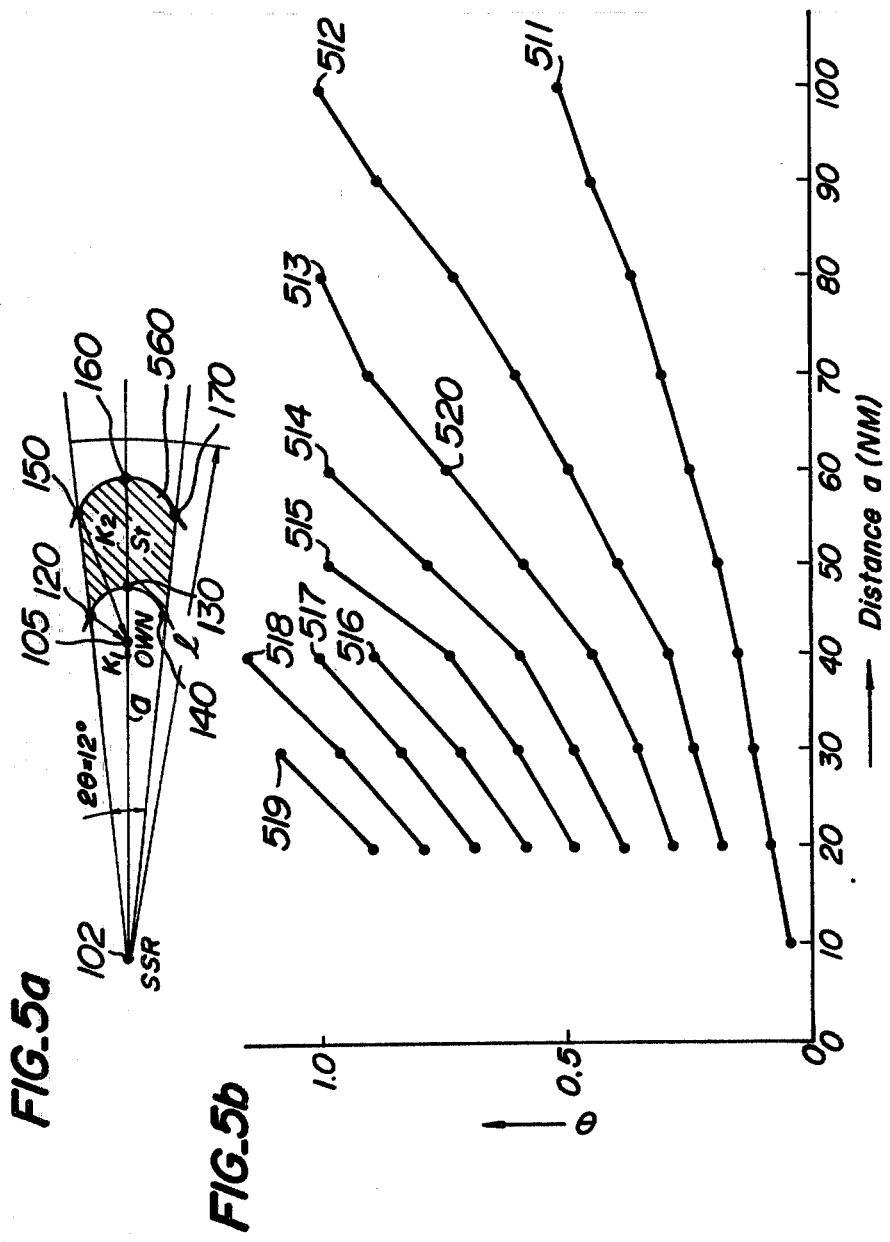
FIG. 5a shows that part of the surveillance area which will be monitored using the gate signal of FIG. 4b.
FIG. 5b is a plot of distance of a craft from ground radar vs. rate of enlargement of the surveillance area.

FIG. 5(b) shows the rate of enlargement of a surveillance area using diversity effect. In this Figure, the distance from the SSR antenna 102 to the given aircraft is plotted vs. the rate of enlargement of area, along the abscissa and ordinate respectively, and assumes the volume of a sphere having a radius of 14 NM, with the other aircraft at the center. FIG. 5(a) shows that part of the surveillance area which will be monitored using the gate signal of FIG. 4(b) and a beam width for the ground SSR station of 6°. The surveillance area is shown by hatched-line zone 560 connecting points 120, 130 140, 170, 160, 150 and 120. The volume of the aerial space will vary with distance from the ground SSR station of the given aircraft as shown in FIG. 5(b). When there is only one ground station, the volume variation rate is small as will be seen from curve 511. FIG. 5b shows eight additional ground stations corresponding to curves 512, 513, 514, 515, 516, 517, 518 and 519 respectively. It will be seen that the volume variation rate increases with an increase in the number of ground stations. Usually the ground SSR stations are arranged so that 3 to 5 stations overlap in a given area. In the "Kanto area" (around Tokyo) of Japan where about 14 stations are located, overlapping is very rare. The average distance between adjacent ground SSR stations is about 60 NM. "Average arrangement of stations" when referred to herein means such an arrangement.

Considering a 3 ground station arrangement, it will be seen at point 520 on the line 513 that a value of 75% is obtained. This means that 75% of B-CAS range is covered by such passive surveillance system. The B-CAS range is an aerial space of 14 NM about the given aircraft.

The number of suppression out signals (SOT) from the ATC-transponder 106 in response to an interrogation signal from an SSR station is a function of the number of SSR stations. Considering that the ground SSR station has an interrogation period of 400 pps, a beam width of 6° and an antenna rotating period of about 4 sec. (there is also 6 sec or 12 sec.), the number of interrogations from the ground SSR station per one rotation of the antenna will be:

$$(6°/360°) \times 4 \sec \times 400 \text{ pps} \approx 26.6$$

Accordingly, if there are 26.6 interrogations within 4 second, or about 6.6 times per second, the presence of one station is indicated. Using this knowledge, a rough number of ground stations involved can be obtained by counting the suppression out signal (SOT) in the counter 306 and averaging the count per unit time. The rotating period of the antenna of a ground SSR station is about 10 seconds at most so that the counter 306 should preferably be arranged to continuously count for about 10 seconds and to provide an average value per second.

As suggested by the point 520 of FIG. 5(b), in order to obtain a surveillance coverage range of more than 75% of B-CAS range, a decision as to the "surveillance range narrow" must be made if the number of the interrogation signals received is less than 6.6 pps × 3(station = 19.8 ≈ 20 pps. Should the number be less than approximately 20 pps the counter 306 will deliver an output signal on line 337 to an amplitude comparator controller 312 to indicate "surveillance range narrow".

The amplitude comparator 312, when an active surveillance instruction signal 346 is not in its ON state (in which it is placed by any one of switches 320, 321, and 322), controls the amplitude level on line 339 to gradually and continuously decrease it for instance from −65 dBm to −75 dBm within about 12 seconds.

On the other hand, if the suppression out signals (SOT) are detected at more than 20 pps, the amplitude level on the line 339 is kept at a constant value, for example, −65 dBm, as the normal value. In accordance with the invention, if the suppression out signals (SOT) detected are less than 6.6 pps, in which passive surveillance operation deteriorates to too great an extent, the counter 306 will provide a signal on line 336 to turn on switch 320 to its ON state thereby to convert the system into an active surveillance system.

The "received electric field strength" is also monitored by the amplitude comparator 309 which delivers an output on line 341 to an adder 314, which output is the same as the video output on the line 335 having a level more than −65 dBm, when the average count of the counter 306 exceeds 20 pps. A determination is made by the adder 314 whether the output on the line 341 is a definite response signal or a spurious signal caused by noise, by using the knowledge that the interrogation signals from the SSR stations are transmitted at intervals of 2.5 to 5 ms on line 341. A circuit to make such determination provides a hold circuit of about 5 ms using conventional charge-discharge circuits using RC elements. With such circuit, if the input to the adder 314 is more than 4 pps and of interval less than 5 ms, or in other words if the interrogation signals are received continuously 4 times at intervals of 2.5 ms to 5 ms, the adder 314 delivers an output on a line 344. This output turns on a switch 322 which switches to active surveillance, whereby distance measurement as a function of the field strength can also be made in the active surveillance mode using the method for deriving "received electric field strength in a free space" expressed by Bullington's formula as previously described with respect to step (c) of the passive surveillance system.

FIG. 6 plots distance in NM on the abscissa vs. receiving electric field strength dBm on the ordinate. The transmitting power of ATC-transponder of other aircraft as defined by ICAO ANNEX-10 has a tolerable range of 50 wpp to 1,000 wpp considering losses due to antenna mounting, cables, and other accessories affecting antenna pattern. When the comparator 309 operates at a comparison level of −65 dBm, the distance to the other aircraft is given by a point 751 on a curve 750, i.e. 4.5 NM if we assume the ATC-transponder output power of the other aircraft as 50 wpp and by a point 711 on a curve 710, i.e. 12 NM if we assume said output power as 1,000 wpp. Accordingly, the comparator 309 will operate either at 4.5 NM as shown by a curve 780 or at 12 NM as shown by a curve 790 to indicate existence of other aircraft. Since these values are greatly influenced by the antenna pattern and the transmitting power, the accuracy of distance measurement is not high. Accordingly, if there are 3 or more SSR stations, the term Listen-in should be the main detector for other aircraft. However, as above noted, if the counter 306 determines the number of interrogations to be less than 20 pps, the comparator level is continuously altered from −65 up to −75 dBm. By thus altering the comparator level, the detecting distance is enlarged from the point 751 to a point 752, more than 15 NM. However, this change in comparator level to −75 dBm enlarges the B-CAS surveillance range more than required so that if this modification is used in an aerial space other than that having only a few ground SSR stations, excess switching over to active surveillance may result. This is undesirable since it results in ON-OFF operations of the switch 322 unnecessarily. However, altering of the comparator level can be used as a preliminary step for converting to an active surveillance system by operation of the switch 321 in which case the ON-OFF operation of the switch 322 will enlarge the surveillance range and prevent detection miss.

To summarize, the aforementioned disadvantages accompanying "Term Listen-in" and "Level Listen-in" in the passive surveillance mode are compensated by converting the comparison level in the level listen-in from −65 dBm to −75 dBm by monitoring the number of interrogations of the ground SSR stations by the counter 306, such conversion in the preceding disclosure occurring when the average count of counter 306 is less than about 20 pps in which case switch 321 is closed to activate the active surveillance mode. Additionally, switch 320 is moved to its ON state if the number of interrogations from the ground SSR stations is detected by the counter 306 as less than a predetermined number, for instance less than 7 pps.

The passive surveillance mode therefore is not used to measure the distance to other aircraft or to determine the varying rate of distance. It is used principally for precautionary purposes to detect other aircraft in a B-CAS range of 10 NM to 14 NM. In the passive surveillance mode electromagnetic waves are not transmitted from the given aircraft.

The probability of a detection miss with this passive surveillance system will be considered hereinafter.

DETECTION FAILURE OF "TERM LISTEN-IN"

The detection failure of the "Term Listen-in" may be derived by calculating the enlargement rate $P_{1L}$ of the surveillance area and success rate $P_{2L}$ of the interrogation and response in a "Term Listen-in" area. If an other aircraft is detected at a range of 14 to 10 NM, there is about 50 second preparation time, even when both aircraft are approaching at a speed of 1 mach, to avoid collision. If surveillance is effected in a range of 4 NM starting from 14 NM to 10 NM, the success rate of surveillance is 0.9 and there will be 21.78 second preparation time at an approaching speed of 1 mach. As the rotating period of a ground SSR station antenna is 4 seconds, there will be 5.4 times preparation time prior to possible collision. In ICAO ANNEX-10 or the like, the success rate of surveillance is defined to be 0.9. The probability of non-detection of the other aircraft in the above case is:

$$(1-P_{2T})^{5.4} \approx 4 \times 10^{-6}$$

The enlarging rate of surveillance range, in case of 3 ground SSR stations, is 75% and is on point of 520 in FIG. 5(b). Since aircrafts are always moving, the success rate of surveillance will be $1-(1-P_{1T})^3 \approx 0.984$ considering time and space diversity. The overall failure rate is as follows:

$$4 \times 10^{-6} \times 1.56 \times 10^{-1} = 6.24 \times 10^{-7}$$

As this is a very small number, detection of other aircraft is virtually assured in the passive surveillance mode in which electromagnetic waves are not emitted from the aircraft.

DETECTION FAILURE IN "LEVEL LISTEN-IN"

The detection failure in "Level Listen-in" can be calculated in the following manner. When the count of counter 306 is over 20 pps and active surveillance is not effected, the output of the amplitude comparator controller 312 is constant and is −65 dBm. Accordingly, if we assume the transmission power of ATC transponders of other crafts to be independent of each other and uniformly distributed, the rate of detection failure $P_{1L}$ is defined by; $P_{1L} = 0.5$ for the standard or average value of 200 W. If the counter 306 counts less than 20 pps and the amplitude comparison level becomes −75 dBm, the surveillance distance, expressed by point 752, will be seen to be in this unfavorable case 15 NM. The time required to pass from a point at 15 NM to 10 NM at a speed of 1 mach is 27.2 second. Since the rotating period of the ground station antenna is 4 seconds, 6.8 trials are effected within this 5 NM distance. For 2 ground SSR stations 13.6 trials are effected. If it is assumed that the probability of receiving a signal strength over the comparison level in one trial is 0.65 (pessimistic value obtained by experiment) the rate of detection failure in the "Level Listen-in" will be seen to be very small from the following equation.

$$(1-0.65)^{13.6} + 6.3 \times 10^{-7}$$

The overall detection failure rate is a very small value of $3.12 \times 10^{-7}$ derived from the failure rate term listen-in of $6.24 \times 10^{-7}$ and from failure rate of level listein-in of $P_{1L} = 0.5$ under a constant comparison level functioning in parallel with term listen-in and level listen-in. The overall failure rate may be $6.3 \times 10^{-7}$ even if the number of ground SSR stations is determined by the counter 306 to be less than 20 pps. As noted above, the rate of detection failure is a very small value of $6.3 \times 10^{-7}$ even with the assumption that in one trial the probability of receiving a signal strength over the comparison will be 0.65.

As above described, the boundary condition of deterioration of the rate of detection failure is set at "less than 7 pps SSR interrogations counted by the counter 306" and when this occurs the switch 320 is moved to is ON state to initiate thereby active surveillance to further assure against collision.

ACTIVE SURVEILLANCE

In the passive surveillance, as heretofore described, if other aircraft is detected in the B-CAS range, either one or more of the switches 320, 321 and 322 is turned on and in the ON state thereof operation of the active surveillance is initiated. An active surveillance initiating signal is supplied to a coder 316 via a line 346. The coder 316 operates to generate interrogation signals of MODE-A or MODE-C code defined by ICAO ANNEX-10 standard. The interrogation signal of MODE-A or MODE-C generated by the coder 316 is shown in FIG. 7.

As shown in FIG. 7, pulses 801 and 802 each having pulse width of 0.8 μs interval 806 to form a pulse pair. Six pairs of these pulses each spaced by 5.8 ms±0.1 ms interval 805 to form a MODE-A interrogation group. Pulses 803 and 804 each having pulse width of 0.8 μs are spaced 21 μs apart as shown at 809 to form a further pulse pair. 4 pairs of said pulse pairs each spaced apart 5.8 ms form a MODE-C interrogation group 830.

MODE-A interrogation group 820 is used for the detecting of the distance of the given craft from an other aircraft and for identification purposes. MODE-C interrogation group 830 is also used for detecting the distance between the aircraft as well as for altitude information.

The pulse interval 805 of the MODE-A interrogation group 820 and the MODE-C interrogation group 830, is selected at 5.8 ms±0.1 for the following reason. The repetition period of interrogation signal of existing SSR stations is about 2.5 ms. By selecting the repetition period of B-CAS interrogation signal to be more than twice of said 2.5 ms or 5.8 ms, it is possible to decrease interference should a ground SSR station be sending interrogation signals to an aircraft when a given aircraft is also interrogating the same aircraft. By this means response of ATC transponder of the other aircraft is not interfered with and the probability of its receipt is improved. It should be noted in this connection that the other aircraft is interrogated at a repetition period of 2.5 μs from a ground SSR station having 6° radar beam width and rotating period of about 4 seconds. Further the ground SSR station and onboard B-CAS are not synchronized so that there is the possibility of the other aircraft receiving both interrogation signals at the same time.

The reason for selecting interval 805 as 5.8 ms±0.1 ms is that by allowing ±0.1 ms drift, the fruit noise can effectively be removed.

The reason for forming MODE-A interrogation signals as 6 sets of pulse pairs is based on simulated experiments to determine the optimum number of such pair of pulses so that at least two successive responses will be received from the other aircraft by the interrogating aircraft notwithstanding a number of other ground stations or aircraft are sending interrogations at random to the ATC-transponder of the other aircraft. Our system assumes the possible existence of 800 aircraft in an aerial zone of 60 NM radius as contemplated for future use. The reason for the selection of 4 sets of pulse pairs in MODE-C interrogation signal is the same for selection of six pulse pairs for MODE-A interrogation.

Each interrogation group 820 and 830 originated from the coder 316 is applied to a modulator 311 through a line 351. The modulator 311 contains a highly stable quartz oscillator of 1,030 MHz±0.2 MHz and supplies sufficient power, for example 1 watt, to transmitter 304 in the succeeding stage. The signal of 1,030 MHz±0.2 MHz is pulse amplitude modulated by the aforementioned interrogation groups originated from the coder 316. The pulse amplitude modulation output is power controlled by an output power controller 305 through a line 354. The reason for control of power level will be explained hereinafter.

The pulse amplitude modulation output from the modulator 311 is applied to the transmitter 304 through the line 352 and power amplified output of for instance 300 wpp is sent to a line 353. The output power of the transmitter 304 on the line 353 is supplied alternately to the antennas 104 and 105 by switching the antenna switches 301, 302 and 319 under control of the control signals 841 and 842 (see FIG. 7) sent from the decoder 315 on lines 360 and 361.

Two antennas 104 and 105 are used because by mounting them on the aircraft on top side and on bottom side thereof, better space coverage can be obtained to ensure coverage for the full range of B-CAS range of 14 NM radiu. One antenna 104 of the two is used with the ATC transponder. The switching of the antennas is effected in the following manner. As shown in FIG. 3, the first pair of the MODE-A interrogation signals shown in FIG. 7 are irradiated from the antenna 104 via line 331 under control of the control signal 841 (see FIG. 7) from decoder 315 to the antenna switch 301 via line 360. When switch 301 connects line 331 with antenna 104, the antenna switch 319 is operated by the gate signal 842 (FIG. 7) also from decoder 315 via the line 316. When the contact of switch 319 transfers it connects the line 331 to the transmitter 304 via line 353. The second pair of MODE-A interrogation signals are irradiated from the transmitter 304 through the line 353, antenna switch 319, line 330, antenna switch 302 and antenna 105 since only the antenna switch 302 is operated by the control signal 842 via the line 360 to connect the antenna 105 to the line 330, antenna switches 301 and 319 not being operated.

The same operation is alternately repeated so that the interrogation groups of MODE-A and MODE-C are pulse amplitude modulated at a frequency of 1,030 MHz±0.1 MHz in the modulator 311 and then power amplified in the transmitter 304, odd number of pairs of the interrogation signals being irradiated from the antenna 104 and even number of pairs of interrogation signals are irradiated from the antenna 105.

The antenna switches 301, 302 and 319 are made to operate about 25 $\mu$s prior to the occurrence of the pulses 801 or 803 and to remain in operation about 25 $\mu$s after the termination of pulses 802 or 804. This means that the antennas 104 and 105 operate for 58 $\mu$s (a time nearly equal to sum of 806, 807, 808) for MODE-A interrogation and for 71 $\mu$s (a time nearly equal to sum of 807, 809, 808) for MODE-C interrogation and as indicated antenna 104 operates for odd number of pairs of interrogation signals and 105 operates for even number of pairs of interrogation signals, alternate groups of such signals being connected to the transmitter 304.

The interrogation signals of MODE-A and MODE-C irradiated from the antennas 104 and 105 are received by an ATC transponder of an other aircraft located within a radius of 14 NM.

The response signal of the ATC transponder on the other aircraft to the interrogation signal is received by the antenna 105 and is applied to the 1,090 MHz receiver 303 via the antenna switch 302 and a line 333. It is assumed here that prior to the reception of the response signal, the antenna switch 302 was closed to the position shown in FIG. 3 by the control signal 842 on the line 360. The receiver 303 is used in common with the passive surveillance and the detected video signal obtained from the amplitude modulated signal is applied to an input of a defruitor 310. In the time of active surveillance, however, this video signal on the line 335 is not used in the comparator 309.

The defruitor 310 contains a memory register in it and memorizes all the response signals for the first pulse pairs in MODE-A interrogation within 200 $\mu$s after completion of irradiation of the pulse 802. The duration of 200 $\mu$s is the required transmission time for covering an area of 14 NM radius. Since the defruitor 310 memorizes all the responses during the period of said 200 $\mu$s, there may be fruit noise included therein. For the second pair of MODE-A interrogation, all the incoming signals are likewise memorized; however, the received signals are compared successively with the memory signal received in response to the first pair. By such comparison, on coincidence of the received response and the memory signal, the response signal is identified as a true response signal to the interrogation. In making the comparison, the distance moved by the aircraft during 5.8 ms of the interval 805 is neglected. In this way, the fruit noise can be eliminated since it is very rare that fruit noise will occur at regular intervals. The defruitor 310 delivers an output on line 342 only when coincidence of signals occurs in comparator 309.

In the MODE-A interrogation there are 6 pairs of interrogation pulses. The defruitor 310 therefore has 5 chances of detecting the presence of the other aircraft. With even one out of 5 chances of obtaining coincidence it is possible to detect the response time difference $t_0$ when transmitting to the other aircraft. This response time difference $t_0$ makes possible the determination of the distance between the aircraft in the decoder 315. Thus, the distance between aircraft can be obtained by:

$$(t_0 \mu s - 3 \mu s) \times 150 m/\mu s$$

For MODE-C interrogation, the response signal of the other aircraft will include manometer altitude information defined by ICAO ANNEX-10, by which the altitude information is gray coded at 100 feet steps. Also for such response signal, the defruitor 310 is effective to eliminate fruit noise.

From the MODE-A interrogation signal, the distance between one's aircraft and the other aircraft located within a range of 14 NM radius can be determined. Further, from the MODE-C interrogation signal, the relative altitude of the other aircraft and also the distance between aircraft can be determined. The location information including distance and altitude information are supplied to the decoder 315 via a line 342. The decoder 315 has the function of tracing detected aircraft which may be an intruder or a threat aircraft, from the information obtained from the defruitor 310. For an effective detection means of intruder or threat aircraft, a control signal is provided to prevent deterioration of the response rate and to minimize occurrence of fruit noise. Such control signals are provided on the lines, 349 and 350 to the coder 316 and to the output power controller 305.

In the active surveillance phase, the location information concerning the other aircraft and obtained in the preceding surveillance is stored in the decoder 315 and is used to determine the time and transmission power of succeeding surveillance interrogations in a manner described hereinafter. By such determination, the control signals are provided on the lines, 349 and 350 to the coder 316 and to the output power controller 305 in order to minimize the average number of interrogations. This is done to enhance the operation in the active surveillance mode. The method will be explained in the following steps (A) and (B).

(A) SURVEILLANCE FOR INTRUDER AIRCRAFT:

If at least one other aircraft is located within 14 NM (indicated by the location information) an active surveillance for intruder aircraft is made using the interrogation sequence shown in FIG. 8(a). In FIG. 8(a), 901 represents one set of interrogation groups of MODE-A and MODE-C as shown in FIG. 7. After lapse of 3 seconds shown by 903 another active surveillance 902 of the same interrogation groups is effected.

Interrogation groups 901 and 902 spaced 3 seconds apart, form a pair of surveillance signals. The pairs are repeated at 12 second periods 904 as shown in FIG. 8A. The object of this (A) active surveillance for intruder aircraft is to surveil at 12 second periods for the purpose of detecting other aircraft located within 14 NM and approaching each other. Detection of an approaching aircraft is effected in the following manner. Using the distance $R_{1j}$ to an other aircraft obtained by active surveillance 901 and the distance $R_{2j}$ obtained by active surveillance 902, the difference in the distance (in the 3 second interval) $R_{2j} - R_{1j} = \Delta R_j$ is calculated for each of aircraft within the 14 NM area. If $\Delta R_j$ is negative, it is assumed as approaching and an approximate time before collision is represented by $R_{2j} \div \Delta R_j$. If manometer altitude information is obtained by the two active surveillances 901 and 902, the difference in altitude between the two aircraft concerning which $\Delta R_j$ is negative can also be determined and a rate of decrease in the altitude difference provided.

There may be situations where an aircraft though flying in the same general direction($\Delta R_j$ is positive) there will nevertheless be a chance of the other aircraft becoming a threat by a sudden change in flying direction, particularly if the distance between them is fast closing. In such case, the active surveillance system starts interrogation with the pulse sequence of FIG. 8(b) as hereinafter described.

(A-1) DISCONTINUATION OF ACTIVE SURVEILLANCE FOR INTRUDER AIRCRAFT

If no other aircraft is detected within 14 NM by the active surveillances 901 and 902, a condition is easily detected by failure to receive response signals, the decoder 315 delivers a discontinuation signal to terminate active surveillance for intruder aircraft to the switches 321 and 322 via line 348 whereby these switches are activated to their OFF state to discontinue the active surveillance mode for intruder aircraft and to reinstate the passive surveillance mode, thereby avoiding unnecessary irradiation of waves.

(A-2) ALTERATION OF THE TIME INTERVAL OF THE ACTIVE SURVEILLANCE

If one or more of the aircraft detected by the active surveillances 901 and 902 within 14 NM satisfies the following conditions (a) and (b), the control signal on the line 349 to coder 316 is changed to high level to change the time interval of the active surveillance to 3 seconds as shown in FIG. 8(b) for the purpose of commencing threat aircraft surveillance. The start point of the threat aircraft surveillance is at the time of 921. However, since both the intervals between 901 and 902 and also 921 and 922 are 3 seconds, the actual start point for threat aircraft surveillance can be assumed to be the rightmost pulse 901 of FIG. 8(a) followed by 902 and then 921, 922, 923, etc.

The signal on the line 349 to coder 316 is changed to the high level shown in FIG. 8(b) under the following conditions:

(a) approaching speed $|\Delta R_j| > 43.5$ m/sec or the mutual distance is less than 1.8 NM.

(b) altitude difference is less than ±800 feet or it is determined from the varying rate of the altitude difference that the altitude difference will be ±800 feet within a time of $R_{2j}/\Delta R_j$ ($R_{2j}/\Delta R_j$ is the time before collision). Also included is the case where the altitude information is unobtainable due to disturbances, incomplete altitude information, inoperativeness or the like.

If the abovementioned conditions (a) and (b) are not met, the active surveillance for intruder aircraft of the B-CAS is effected under control of the pulse form of FIG. 8(a). During the 12 seconds, the wave 901 is irradiated 10 times and the wave 902 is irradiated also 10 times. This means that 1.66 interrogations are effected per unit time or per second. Hereinafter this status is referred to as 1.66 pps). The low level less frequent, interrogation is effected irrespective of the number of other aircrafts in the radial 14 NM from one's aircraft. As previously noted if there are no other aircraft in the B-CAS range of 14 NM radius, the condition (A-1) applies and the system will normally return to the passive surveillance mode unless the passive surveillance mode does not establish the presence of or more than ground SSR station. More specifically, if the number of received interrogations detected by the counter 306 is below a predetermined number, for instance less than 7 pps, the active surveillance shown in FIG. 8(a) is continued even after establishment of the condition (A-1). By this arrangement, the drawback of passive surveillance systems, as for example, over oceanic flight paths, where no ground stations exist, or where flights ouside of the coverage zone of ground SSR stations may take place, is avoided.

(B) SURVEILLANCE FOR THREAT AIRCRAFT

If the location information of the other aircraft in the B-CAS area is detected by the intruder active serveillance of 901 and 902 shown in FIG. 8(a) and further if the conditions of (A-2)-(a) and (b) are both satisfied, the intruder active surveillance is converted to a threat aircraft surveillance using the interrogation pulses of FIG. 8(b).

The active surveillance for threat aircraft using the interrogation pulses of FIG. 8(b) is effected at 3 second interval interrogation groups as previously explained. The object of this mode is to obtain location information of other aircraft at 3 second intervals and to find an aircraft among the located aircraft which is developing into a collision threat. For this purpose so-called "tracking" is effected.

Tracking is used to detect positional change of each aircraft with respect to time. Such detection affords information concerning past route, estimated course, and position of the aircraft. Tracking accuracy depends on the ability to separate a number of aircraft without confusion and the ability to compensate for conditions of no response caused, for example, by some disturbance of the electromagnetic waves during the tracking, by which the present position of an aircraft can be estimated from the past data. Disturbance of the electromagnetic waves may be caused by the other aircraft being located in a split zone of the antenna pattern or by an unusually large number of interrogations being placed on the ATC transponder of another aircraft. It should be noted that the disturbance of the electromagnetic wave is a rare occurrence.

Tracking accuracy is important for locating a threat aircraft because without it position information of another aircraft and the possibility of collision cannot reliably be obtained. The method of tracking is shown in FIG. 10. Abscissa of the diagram of FIG. 10 measures time and the ordinate is the distance between aircraft. For instance, active surveillances 901, 902, 921, 922 are effected at times $T_{n-2}$, $T_{n-1}$, $T_n$, $T_{n+1}$ of 3 second interval and obtained distance information of 2 aircraft are shown by black dots of 1111, 1112, 1113 and 1131, 1132, 1133 respectively in FIG. 10. Assuming time $T_n$ as the present time and considering the black dot 1133 at time $T_n$ from the distance information 1111 and 1112 obtained in the past at times $T_{n-2}$, $T_{n-1}$, a future location at time $T_{n+1}$ is forecast by white dot 1123 on a line connecting said two points 1111 and 1112. Taking this forecast point 1123 as a center and considering a tolerance value for the forecast data of for instance ±130 m, a determination can be made as to whether the actually measured value at time $T_n$, represented by black dot 1113, lies within the tolerance zone or not. The tolerance selected should take into account possible sudden acceleration of the other aircraft or possible error in the measuring system.

Following the foregoing procedure using dots 1111, 1112, and 1123, the difference between the actually measured values 1112 and 1113 at the times $T_{n-1}$ and $T_n$, is used to calculate estimated value in the past represented by white triangle 1121 on an extension of a line connecting the black dots 1112 and 1113.

This point 1121 should be located within a tolerable range from a center at black dot 1111 at the time $T_{n-2}$. The detection method involves taking the difference between the actually measured values, shown by black dots 1111 and 1112, and adding the difference to the actually measured value of 1112 to obtain the forecast value 1123 at the time $T_n$. Then it is determined whether the difference between actually measured value 1113 and the forecast value 1123 is in the range of ±130 m or not. Additionally, the difference between the actual measurement values represented by dots 1112 and 1113 is added to the measured value of black dot 1112 to obtain the estimated value in the past shown by 1121 and it is then determined whether this point is located inside the tolerable range of ±130 m from the actually measured center value represented by dot 1111.

Our method involves connecting 2 measured points by a line and plotting an estimated point on an extension of said line to confirm whether the estimated point is in the tolerable range or not.

In the active surveillance system for intruder aircraft shown in FIG. 8(a), distance information is obtained with 2 measurements as is also the approach of aircraft. With this method, approach information will not suffer from error. One example will be described.

In FIG. 10, consider a flight route of one aircraft shown by black dots 1111, 1112, 1113, and consider the presence of a further aircraft navigating on a route shown by black dots 1131, 1132, 1133. We may assume 4 estimated points at the time $T_n$, i.e. white dot 1123 based on the black dots 1111 and 1112; white dot 1124 based on the black dots 1111 and 1132; white dot 1142 based on the black dots 1131 and 1112; and white dot 1143 based on the black dots 1131 and 1132.

In the active surveillance mode, at the time $T_n$, the actually measured values of black dots 1133 and 1113 are obtained. In the same manner as has been explained above with respect to location the white triangle 1121, an estimated point, shown as a white triangle 1151, can be obtained and judged whether or not it lies within a tolerable range of ±130 m from a center 1131 and a forecast point 1152 at $T_{n+1}$ is set. For the white dot 1142 based on the black dots 1131 and 1112 and the white dot 1124 based on the black dots 1111 and 1132, there are no actual measured values and thus they are omitted because they cannot be the basis for forecasting the future and the past. This is explained as follows. The estimated location information points 1142 and 1124 resulted from routes of two non-existing aircraft and should therefore be excluded from analysis. By considering every combination for the 2 flying routes 1111, 1112, 1113 and 1131, 1132, 1133, the actual flight routes can separately correctly be identified.

If the speed calculation is effected only from the variation of 2 points obtained from the intruder aircraft, surveillance being with the pulses of FIG. 8(a), correct approaching speed based on black dots 1111 and 1112 will not be obtained but a false indication of approaching speed will result based on black dots 1111 and 1132 and an erroneous threat alarm may be the result. This is the reason for using threat aircraft surveillance having tracking function using the interrogation pulses shown in FIG. 8(b).

A method which compensates for loss of information when tracking an aircraft will now be explained.

In the above described method of tracking, tracking of aircraft was effected by means of three sequential responses to interrogations from a given craft. This as above explained is shown by black dots 1111, 1112, 1113 for one aircraft and 1131, 1132, 1133 for another aircraft. If the active surveillance mode at the time $T_{n+1}$, for example, a fourth point 1134 can be measured which is within a tolerable range of ±130 m from the center of a predicted point 1152, the prediction being based on the actually measured dots 1131, 1132, 1133 but in the case of the other aircraft, the actual measured value indicated at 1114, which should lie in the tolerable range from a central white circle 1125, which is the predicted point based on actually measured dots 1111, 1112, 1113, does not lie in the tolerable range, for example, due to changes in transmission condition or the like. In this case since at time $T_n$ three successive measurements have been made so that the predicted value 1125 is used just for purpose of compensation. Such compensation can be made at most twice. This form of compensation is used only when successive measurements have been made, not less. Thus, the predicted points 1142 and 1124 at the time $T_n$ will not be used for compensation purposes since only 2, not three, actual measurements have been made.

By using the abovementioned method of tracking, all aircraft in the B-CAS range will be tracked and distance and varying rate information will be provided. The abovementioned surveillance for threat aircrafts at 3 second interval (FIG. 8(b)) is the key to finding the extent of such threat. As the result of such active surveillance for threat aircraft by tracking, if no threat aircraft is found, such active surveillance will not be continued. Accordingly, if the threat aircraft does not exist or determined not to be a threat aircraft under the conditions (B-1)-(a) or (B-1)-(b) discussed below, the tracking surveillance mode is returned to the intruder aircraft surveillance mode and the interrogation will be in accordance with the pulse sequence of FIG. 8(a) in order to avoid excess irradiation of the interrogation electromagnetic wave.

(B-1) CONDITION FOR TRANSITION FROM THREAT AIRCRAFT SURVEILLANCE TO INTRUDER AIRCRAFT SURVEILLANCE (a) The distance between aircraft is more than 1.8 NM and is in positive speed (parting) or in negative speed (approaching) $\Delta R_j > 43.5$ m/s.

(b) Although the distance between aircraft is less than 1.8 NM or in negative speed of $\Delta R_j > 43.5$ m/s, the altitude difference is more than $\pm 900$ feet or it is determined from the varying rate of such altitude that the altitude difference will be more than 900 feet after the time of $R_{2j}/\Delta R_j$.

If the conditions (a) or (b) above, is satisfied, a control signal on the line 349 changes from high level FIG. 8(*b*) to low level FIG. 8(*a*) and is sent to coder 316 to indicate alteration of the interrogation period so that the system returns to intruder aircraft surveillance.

(B-2) CONTROL OF INTERROGATION POWER IN THE THREAT AIRCRAFT SURVEILLANCE

The transmission power of the interrogation signal shown in FIG. 8(*b*) must be controlled. The reason for this control lies in that when a trheat aircraft comes too near to the surveillance craft, i.e. approaches within 4 NM range, it is possible that receipt of a response and the interrogation signal may be interfered with. It is therefore desirable to lower transmission power so that the threat aircraft alone is within the space range of the irradiating interrogation signal to the exclusion of other craft. Reduction of power also enhances tracking of the threat aircraft since responses from other aircraft further than 4 NM will not be received. Reduction of power also narrows the covering zone of the interrogation wave and thus reduces interference with the ground SSR stations or with other aircraft.

The normal transmission power of the transmitter 304 in its active surveillance mode is 300 wpp, but it is lowered by a power control signal to 30 wpp when the tracked aircraft becomes a threat craft as it would be if it were within 4 NM and collision time is determined to be less than 40 second. The power control signal is provided by the decoder 315 to the output power controller 305 by means of line 350. For example, for 300 wpp, the power control signal is at high level and for 30 wpp it is at low level. The output power controller 305 simultaneously controls by means of the control signal both the modulator 311 and the transmitter 304. The control used is well known and involves making higher or lower the supply voltage of the amplifier.

In the abovementioned threat aircraft surveillance for the object of tracking and determining the threat condition of an aircraft using the pulse sequence of FIG. 8(*b*), the interrogation groups shown in FIG. 7 are transmitted at 3 second intervals, more specifically 6 times of MODE-A and 4 L times of MODE-C are transmitted, so that the number of interrogations per second is 3.33 (3.33 pps). If there is no threat aircraft or the threat condition is relieved, the system returns to intruder aircraft surveillance using the pulse sequence shown in FIG. 8(*a*) and the number of interrogations per second becomes 1.66 pps.

Figure 9:
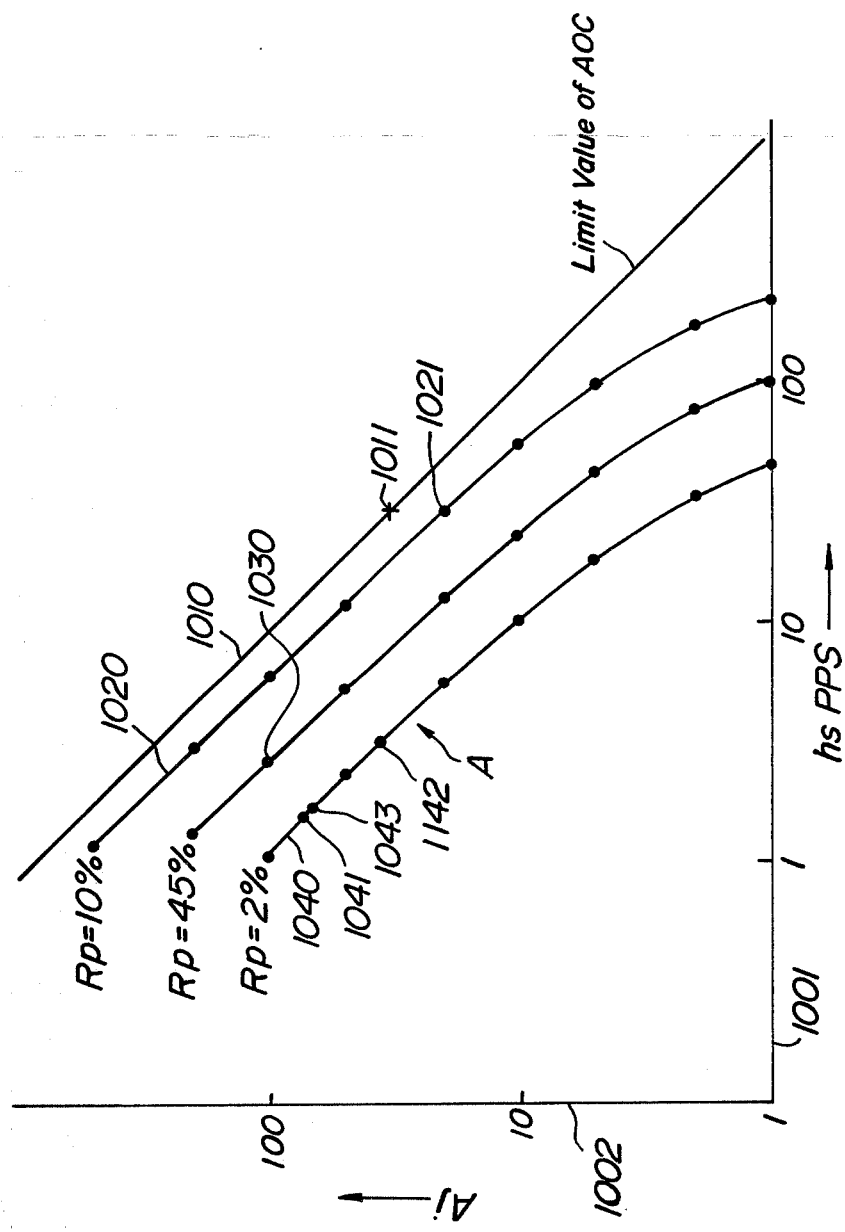
FIG. 9 is an explanatory diagram for showing deterioration rate of response in case of the active distance measurement system.

FIG. 9 shows the relation between the number of aircraft Aj and the number of interrogations per second hs required for measuring distance by B-CAS of each aircraft, taking the deterioration rate of response of ATC as a parameter. The abscissa of the graph of FIG. 9 represents the number of interrogations hs per second of a B-CAS mounted on an aircraft and the ordinate thereof is the number of aircraft located in the B-CAS range. The curve 1010 is the critical value for the automatic overload control (AOC).

The AOC is provided to protect against over operation of the transmission facility. When too many interrogation signals are received by an ATC transponder it lowers the receiving sensitivity of the transponder. According to ICAO ANNEX-10 standard, the sensitivity of the transponder is lowered by 3 dB at 90% of 1,200 pps of received interrogations and by more than 30 dB at 150% of 1,200 pps. Therefore if approaching aircraft make interrogations of 30 pps by the B-CAS, as is shown at point 1011 on the curve 1010, the critical value of AOC will be arrived at when 34 aircraft transmit interrogation signals to each other, and the operation of the ATC transponder will adversely be affected. The maximum number of aircraft should be about 20, if the deterioration rate is to be kept within about 10% (to obtain 90% response), as can be seen from point 1021. The curves 1020, 1030 and 1040 are characteristic curves showing the deterioration rate of the ATC transponder caused by interrogation of B-CAS. Curve 1020 is for 10%, 1030 is for 4.5%, 1040 is for 2% of deterioration rate of response.

The curves 1020, 1030, 1040 are obtained by solving the following formula.

$$R_p = K.Aj.td.hs + tc.hs$$

wherein:
- $R_p$ ... rate of deterioration of response of ATC transponder for each of (=0.1; 0.045; 0.02)
- k ... rate of split of antenna pattern (assumed as =1)
- hs ... number of interrogation of B-CAS per second (=0.1~1,000 pps)
- td ... dead time of transponder (to be set as =152.65 μs)
- tc ... suppression time by B-CAS of own aircraft (to be set as =300 μs)
- Aj ... number of aircrafts in the B-CAS area (=1~400)

The improved response according to the present invention will be explained by referring to FIG. 9.

One example of interrogation rate for intruder aircraft by active surveillance is given with respect to FIG. 8(*a*) as 1.6 pps. The other example of interrogation for the tracking of threat aircraft by the active surveillance is given with respect to FIG. 8(*b*) as 3.33 pps. At the number of interrogation of 1.66 pps, the rate of deterioration of response of ATC transponder is about 2% when 75 aircraft are situated in the B-CAS area as shown by dot 1041. Although unlikely, if all the aircraft detect a threat condition and change the interrogation signal to 3.33 pps, the deterioration rate of the ATC transponder is also about 2% when 37 aircraft are located in the B-CAS area as is shown by point 1042.

However, because there is also traffic control from the ground, it is unlikely that there will be a large number of craft in an active surveillance zone. In observing a simulated zone, it turned out that about 10% of the aircraft in the zone could be considered in a threat situation and the mutual TAU was less than 60 seconds. This finding is supported by 1EE transactions on Aero Space and Electronic System, January 1970; "A Statistical Evaluation of Aircraft Collision-Hazard Warning System Technics in the Terminal Area." In this publication the number of aircraft in a surveillance zone, which assume TAU<60, is about 10%.

Accordingly, even if the active surveillance is made in a high density zone such as near a terminal, about 90% of the aircraft in that zone will initiate intruder aircraft surveillance using the pulse sequence of FIG. 8(*a*) at 1.66 pps and the remaining 10% will initiate threat aircraft surveillance using the pulse sequence of FIG. 8(b) at 3.33 pps so that average number of interrogation signals received becomes 1.83 pps.

(0.9×1.66 pps+0.1×3.33 pps).

IN the conventional active surveillance system, the interrogation period is not altered with respect to the condition of the aircraft, i.e. whether intruding or creating a threat. Prior systems use the same number of pulses per second for example 3.3 or 30 pps but not interchangeably.

In the system of the present invention, the interrogation period is selected as a function of the aircraft being an intruding or a threat aircraft. Thus, the interrogation period can be selected as 1.66 pps or 3.33 pps with the average value becoming 1.83 pps as previously noted. With a 2% deterioration rate of response of ATC transponder at an average of 1.83 pps interrogations, a considerable number of aircraft say 70, may be present in the B-CAS zone without adversely affecting the receiving function of the ATC transponder.

Accordingly, considering that only 37 aircraft can be present in the surveillance zone at 3.33 pps interrogations with presently available systems, it can be seen that by adapting our system to interrogations at 1.66 pps the number of aircraft that can be in the zone without adversely affecting the ATC transponder is nearly doubled. This also means that interference may be decreased ½ for the same number of aircraft. Also, the capability to reduce the zone of irradiation by lowering the power of the transmitted energy contributes by square value of the reduced distance to enhance the operation of the ATC transponder. The reason for this can be explained as follows. By means of the power control, if the transmission power is decreased to about 1/10, the propagation distance becomes about ⅓. The surveillance zone may become 1/10 considering a projected plane. If the aircraft are assume to be uniformly distributed in the zone, the number of aircraft in that zone will also be reduced to 1/10 so that the rate of deterioration of response is also improved by 10% and it becomes 0.2%.

In the threat aircraft surveillance as has been explained in the foregoing, the information for the approaching threat aircraft is tracked by the decoder 315, which also monitors distance between craft information, approaching speed, the time before collision (TAU) altitude difference, and rate of variation of altitude. Thus output decoder 315 supplies threat evaluation circuit 317 which signals the threat aircraft to an indicator 318 through a line 347 in case of emergency. The threat aircraft is indicated visually by the indicator 318 and also an audio threat signal is provided thereby to attract attention of the pilot.

The following conditions ascertained by the threat evaluation circuit alert the pilot:

(1) Altitude difference is within ±800 feet or judged to come within ±800 feet and TAU≦40 second or closing within 1.8 NM under these conditions a caution signal is generated by the indicator 318 to alert the pilot for remedial action.

(2) Altitude difference is within ±800 feet or judged to become within ±800 feet, and TAU≦25 second or approaching within 0.8 N. In this case, the indicator 318 instructs the pilot to descend when the threat aircraft is 100–800 feet above the pilot's plane, and to ascend when the threat aircraft is 100–800 feet lower than the pilot's plane. Also the indicator 318 may instruct the pilot to descend or to ascend depending, for example, on whether an earlier discovered aircraft has the right to ascend.

In this respect, if one's aircraft is in ascending or descending operation, an instruction to navigate horizontally may be given by the indicator 318.

According to the system of the present invention, the passive surveillance and the active surveillance are effectively combined to provide in the passive surveillance information of location of other aircrat and in the active surveillance, the number of interrogation pulses and power of surveillance are controlled to deal with intrusion and threat conditions and in a manner so that disturbance of ATCRBS is substantially decreased and thus contributes to navigation safety.

The invention may be carred out in various other ways without departing from the spirit thereof. It being intended that its scope be determined by the following claims.

What is claimed is:

1. A surveillance system for avoiding collision between aircraft using radar beacons and comprising a surveillance means for other aricraft, a surveillance means for intruder aircraft, a surveillance means for threat aircraft, wherein said surveillance means for other aircraft comprises the following three listening means (a), (b) and (c);
   (a) a term listen-in means to detect a term from a time of receipt by one aircraft of an interrogation signal emitted from a ground secondary surveillance radar station to a time of receipt by said one aircraft of a response signal sent from an other aircraft responding to said interrogation signal, and to judge whether said detected term is within a predetermined term or not,
   (b) a level listen-in means to judge whether the receiving level of said response signal from said other aircraft received by said one aircraft exceeds a predetermined level or not,
   (c) an active listening means comprising a secondary surveillance radar in said one aircraft for irradiating interrogation signals of comparatively low power at predetermined time interval for detecting the presence of a response signal from aircraft; said surveillance means for intruder aircraft comprising a means effecting at least two judgments, a first of which is to intermittently irradiate interrogation signals having at least two interrogation groups having a predetermined interval at a power higher than that of said active listening means, to receive a response signal from responding aircraft and to judge whether the time elapsed between sending said interrogation signal to receipt of the response signal is within a predetermined time limit or not, the second judgment being whether a rate of shortening of said time is greater than a predetermined rate or not;
   said surveillance means for threat aircraft comprising a means for effecting at least three judgments, a first of which entails intermittently irradiating interrogation signals having at least three interrogation groups having a predetermined interval at a power higher than that of said active listening means, said predetermined interval being shorter than that of said surveillance means for intruder aircraft, response signals from aircraft responding to the interrogation signals being judged as to whether a time from the interrogation to the reception of the response is within a predetermined time or not, a second judgment being whether the shortening rate of said time is longer than a predetermined rate or not, the third judgment involving calculating the estimated time before collision between one's and other aircraft and to judge whether such calculated time is shorter than a predetermined value or not; and means to judge conditions of at least one of said listening means (a), (b) and/or (c), to judge conditions of at least one of said two judgments for intruder aircraft surveillance and to judge conditions of at least one of said three judgments for threat aircraft surveillance, and based on said judgments and whether an aircraft intrusion or threat condition exists, to effect transfer from the surveillance means for other aircraft to the surveillance means for intruder aircraft and from the surveillance means for intruder aircraft to the surveillance means for threat aircraft and conversely from the surveillance means for threat aircraft to the surveillance means for intruder aircraft and from the surveillance means for intruder aircraft to the surveillance means for other aircraft.

2. A surveillance system as claimed in claim 1, wherein said interrogation signals having said at least three interrogation groups having its said predetermined interval at a power level lower than that of the interrogation signals in the intruder aircraft surveillance means and are interposed between said interrogation signals in the intruder aircraft surveillance means.

3. A surveillance system as claims in claim 1, wherein said irradiation of interrogation signals in the threat aircraft surveillance means is effected at equal time intervals.

4. A surveillance system as claimed in claim 1, wherein a means to judge the condition of transfer from the other aircraft surveillance means to the intruder aircraft surveillance means comprises at least means to measure the number of interrogation signals received and to judge whether said measured number is smaller than a predetermined number or not, and if smaller than the predetermined number to discontinue operation of the active listening means.

5. A surveillance system as claimed in claim 1, wherein a means to judge the condition of transfer from the other aircraft surveillance means to the intruder aircraft surveillance means comprises at least a means to judge at least one of said three listening means to determine whether it is affirmative.

6. A surveillance system as claimed in claim 1, wherein a means to judge the condition of transfer from the intruder aircraft surveillance means to the other aircraft surveillance means comprises at least a means to judge at least one of said two judgements in the intruder aircraft surveillance means to determine whether it is negative.

7. A surveillance system as claim in claim 1, wherein a means to judge a condition for transferring from the intruder aircraft surveillance means to the threat aircraft surveillance means comprises at least a means to judge at least one of said two judgements in the intruder aircraft surveillance means to determine whether it is affirmative.

8. A surveillance system as claimed in claim 1, wherein a means to judge a condition of transfer from the threat aircraft surveillance means to the intruder aircraft surveillance means comprises at least a means to judge at least one of the first two of the said three judgements in the threat aircraft surveillance means to determine whether it is negative.

9. A surveillance system for avoiding collision between aircraft using radar beacons and comprising a surveillance means for other aircraft, a surveillance means for intruder aircraft, a surveillance means for threat aircraft, wherein said surveillance means for other aircraft comprises the following three listening means (a), (b), and (c);
(a) a term listen-in means to detect a term from a time of receipt by one aircraft of an interrogation signal emitted from a ground secondary surveillance radar station to a time of receipt by said one aircraft of a response signal sent from an other aircraft responding to said interrogation signal, and to judge whether said detected term is with a predetermined term or not,
(b) a level listen-in means to judge whether the receiving level of said response signal from said other aircraft received by said one aircraft exceeds a predetermined level or not,
(c) an active listening means comprising a secondary surveillance radar in said one aircraft for irradiating interrogation signals of comparatively low power at predetermined time interval for detecting the presence or absence of a response signal from aircraft;
said surveillance means for intruder aircraft comprising a means to effect at least three judgments, a first of which is to intermittently irradiate interrogation signals having at least two interrogation groups having a predetermined interval at a power higher than that of said active listening means, to receive a response signal from responding aircraft, and to judge whether the time elapsed between sending said interrogation signal to receipt of the response signal is within a predetermined time limit or not, the second judgment being whether a speed of shortening of said time is greater than a predetermined speed or not, the third judgment being whether relative altitude difference between one's and an other aircraft obtained from altitude information included in the response signal is less than a predetermined value or not;
said surveillance means for threat aircraft comprising a means effecting at least five judgments a first of which entails intermittently irradiating interrogation signals having at least three of said interrogation groups having a predetermined interval at a power higher than that of said active listening means, said predetermined interval being shorter than that of said surveillance means for intruder aircraft, response signals from aircraft responding to the interrogation signals being judged as to whether a time from the interrogation to the reception of the response is within a predetermined time or not, a second judgment being whether shortening speed of said time is longer than a predetermined speed or not, a third judgment involving calculation of estimated time before collision between one's and another aircraft and to determine whether such calcualted time is shorter than a predetermined value or not, a fourth judgment involving determination whether altitude difference between one's and the other aircraft is less than a predetermined value or not by reading altitude information included in said response signal, and the fifth judgment being to judge whether a speed of shortening of said altitude difference is larger than a predetermined speed or not;

and means to judge conditions of said at least one of said listening means (a), (b) and/or (c), to judge conditions of at least one of said three judgments for intruder aircraft surveillance and to judge conditions of at least one of said five judgments for threat aircraft surveillance, and based on whether an aircraft intrusion or threat condition exists, to effect transfer from the surveillance means for other aircraft to the surveillance means for intruder aircraft and from the surveillance means for intruder aircraft to the surveillance means for threat aircraft and conversely from the surveillance means for threat aircraft to the surveillance means for intruder aircraft and from the surveillance means for intruder aircraft to the surveillance means for other aircraft.

10. A surveillance system as claimed in claim 9, wherein said interrogation signals having said at least three interrogation groups having its said predetermined interval at a power level lower than that of the interrogation signals in the intruder aircraft surveillance means and are interposed between said interrogation signals in the intruder aircraft surveillance means.

11. A surveillance system as claimed in claim 9, wherein said irradiation of interrogation signals in the threat aircraft surveillance means is effected at equal time intervals.

12. A surveillance system as claimed in claim 9, wherein a means to judge the condition of transfer from the other aircrafts surveillance means to the intruder aircraft surveillance means comprises at least means to measure the number of interrogation signals received and to judge whether said measured number is smaller than a predetermined number or not; and means effective if the measured number is smaller than said predetermined number to discontinue operation of (c), the active listening means.

13. A surveillance system as claimed in claim 9, wherein a means to judge the condition of transfer from the other aircraft surveillance means to the intruder aircraft surveillance means comprises at least a means to judge when at least one of said three listening means has judged affirmative.

14. A surveillance system as claimed in claim 9, wherein a means to judge the condition of transfer from the intruder aircraft surveillance means to the other aircraft surveillance means comprises at least a means to judge at least one of said two judgements in the intruder aircraft surveillance means to determine whether it is negative.

15. A surveillance system as claimed in claim 9, wherein a means to judge a condition for transferring from the intruder aircraft surveillance means to the threat aircraft surveillance means comprises at least a means to judge at least one of the first two mentioned judgements in the intruder aircraft surveillance means to determine whether it is affirmative.

16. A surveillance system as claimed in in claim 9, wherein a means to judge a condition of transfer from the threat aircraft surveillance means to the intruder aircraft means comprises at least a means to judge at least one of the first two judgements of the said five judgements in the threat aircraft surveillance means to determine whether it is negative and whether at least one of the last two of said five judgements is negative.

* * * * *